Dec. 31, 1935.   J. J. SUNDAY   2,026,072
AUTOMOTIVE VEHICLE HEATING SYSTEM
Filed Oct. 11, 1935
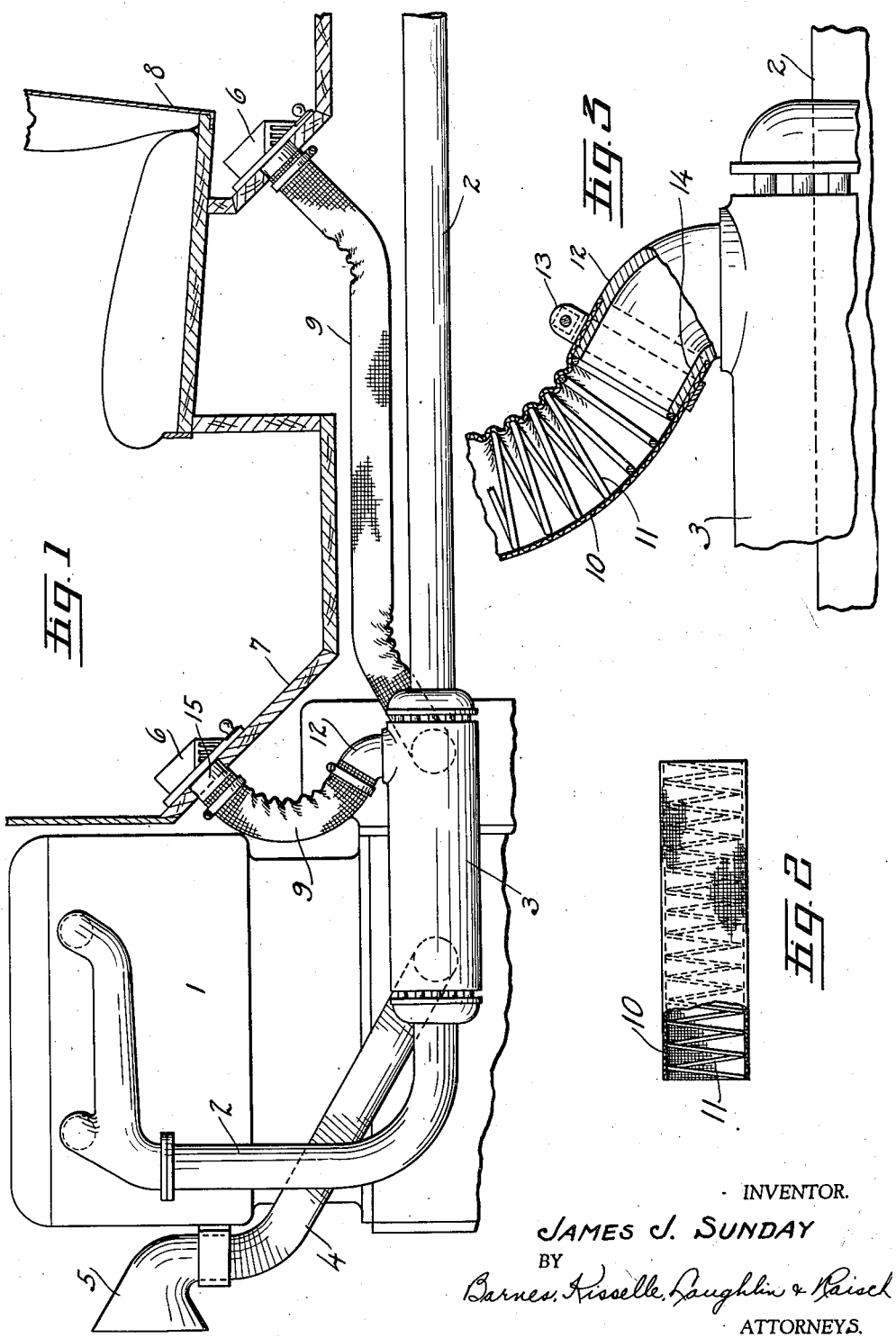
INVENTOR.
JAMES J. SUNDAY
BY
ATTORNEYS.

Patented Dec. 31, 1935

2,026,072

UNITED STATES PATENT OFFICE 2,026,072

AUTOMOTIVE VEHICLE HEATING SYSTEM

James J. Sunday, Detroit, Mich.

Application October 11, 1935, Serial No. 44,476

5 Claims. (Cl. 237—12.3)

This invention relates to an automotive vehicle heating system and more particularly to a heating system which utilizes the heat of the exhaust gases from the internal combustion engine for heating the air before it passes into the vehicle body. This application is in part a continuation of copending application Serial No. 12,221, filed March 21, 1935.

In this type of heating system a heater for effecting heat exchange between the exhaust gases and the air which is subsequently passed into the body is inserted in the exhaust line. The heater is usually inserted in the exhaust line between the engine and the muffler. As is well-known, during the past few years the tendency has been to make automobiles operate much more quietly. Due to this elimination of noise, not only in the automobile motor but in all of the other parts of the automotive vehicle, noises heretofore imperceptible may now be very easily heard much to the annoyance of the driver and the passengers. This silencing of the operation of motor vehicle has made the motor industry reluctant to use exhaust heaters for the reason that the silencing of the operation of this type of heater has been very difficult. It appears that the sound impulses set up by the exhaust gases as they are discharged from the engine are transmitted into the body by two routes, namely, the noise is telegraphed by the air conduit, that is, conducted in the form of vibration directly communicated to the conduit, especially when the conduit is metal, and noise or sound impulses are set up in the air flowing through the conduit between the heater and the body. These latter noises may be called air-borne sounds.

The term "heater noises" as herein used refers to those noises caused by, or originating in the heater, which upon entering the vehicle body either as telegraphed or air-borne noises prove annoying to the ordinary passenger and driver. This invention is concerned with silencing or sufficiently reducing the intensity of these heater noises so that they will not prove annoying to the ordinary driver or passenger. It is an object of this invention to produce a heating system of the exhaust type which is practically silent in operation. This has been achieved by utilizing an air conduit between the heater and the body which not only conducts the heated air from the heater to the body but also dampens out and silences any noise impulses in the heated air and which itself is a non-conductor, that is, a non-telegrapher, of sound.

Heretofore it has been common practice to use flexible metal air conduits between the heater and the hot air register through which the air is admitted into the body. The practice of mounting the motor on rubber permits the motor to float and this in turn has caused the metal conduit to move or float with the engine. Very often such a metal conduit will collide with other parts of the automobile and cause a noise or rattle. It is an object of this invention to eliminate this type of noise. This object has been achieved by utilizing a non-metallic air line which is a non-conductor of sound and therefore may be placed against another part of the vehicle without setting up a rattle.

The applicant is familiar with the Bovey Patent 1,762,467 which shows a short length of flexible non-metallic fabric hose in the hot air line. Bovey points out that the noise caused by an exhaust type of air heater emanates from two different sources; that the primary source of noise is the expanding exhaust gases as they pass in impulses at high pressure from the exhaust line into the enlarged chamber of the heating unit; that these expanding impulsive exhaust gases set up a vibration which causes a ringing noise, and that the secondary source of noise is the vibrations from the engine and the fan which are carried or telegraphed along the metallic tubing forming the hot air conduit. Bovey silenced the noise originating from the secondary source by the insertion in the hot air line of this short length of flexible non-metallic hose. The Bovey patent does not specify the nature of the weave, the length and diameter of the flexible hose, the material from which it is made, or any other of the physical characteristics of the hose because Bovey inserted this flexible hose solely for the purpose of eliminating the noises which would otherwise be telegraphed in the form of vibrations along the hot air conduit. Bovey specifies that the noise created by the primary source of noise was not eliminated by the insertion of the fabric hose and resorted to covering the heater casing with an asbestos lining and further says that this lining serves as a dampening member to prevent the vibrations that cause the primary noise in the heater. Bovey failed to appreciate that the physical characteristics of the hose are vital and must be coordinated with the intensity of the noise or sound caused by the heater and that when these physical characteristics of the hose are properly coordinated with the intensity of the sound caused by the heater that the hose will serve not only to absorb and completely eliminate the secondary noises but also the primary noise and air-borne noises. By so coordinating the physical characteristics of the non-metallic fabric hose the applicant has eliminated all noises, both primary and secondary, and obviated the need for Bovey's lining for the walls of the heater casing.

Another patent in the prior art is Bahnson 1,254,189. Bahnson was concerned with the elimination of noises in the form of vibration directly communicated to the air conduit of his heating system. This he achieved by inserting a short asbestos section in his metal air pipe line. Bahnson was not concerned with the elimination of air-borne sounds and noises and consequently does not specify the physical characteristics of the asbestos pipe section. He does not specify that the asbestos section is a woven fabric hose, and apparently Bahnson's asbestos section was in the form of a cast or molded asbestos casing, the air-borne sound absorbing capacity of which would be practically nil.

In the drawing:

Fig. 1 is a section through an automotive vehicle showing the heating system.

Fig. 2 is a detail of the air conduit.

Fig. 3 is a detail showing the connection between the hot air conduit and the heater.

Referring more particularly to the drawing, there is shown an automobile having an internal combustion engine 1 and an exhaust pipe line 2. The exhaust line 2 conducts the hot exhaust gases to the heater 3. This heater is preferably of the multi-tubular type shown in my prior application Serial No. 742,526, filed September 4, 1934. Fresh air is conducted into the heater 3 by the cold air conduit 4 which is provided with a funnel mouth 5 positioned to the rear of the motor fan. The cold air conduit preferably is the same as the hot air conduit described below or may be a flexible metal tube. The body is provided with a pair of hot air registers 6, one of which is mounted on the toe board 7 and the other of which is mounted on the floor to the rear of the front seat 8. The registers 6 are connected to the heater 3 by the hot air conduits 9. The conduits 9 are identical in construction and therefore only one need be described.

Heretofore it has been proposed to use a flexible metal hose for conducting the air from the exhaust type of heater to the register. However, this metallic hose is impractical because it utterly fails to muffle the air-borne sounds and serves as an excellent conductor along which the heater and engine noises are telegraphed into the body. This metal hose is also a source of rattles.

The applicant has conducted numerous experiments with various types of hoses which will be briefly described: A multiple tube exhaust heater of the type shown and described in my prior application Serial No. 742,526, filed September 4, 1934 was assembled in the exhaust line of a 1935 Ford V-8 engine. The hot air outlets of the heater were connected to the registers by two pieces of linen hose. The hose connecting the front register with the heater was about ten inches long and that connecting the rear register with the heater about thirty-six inches long. The linen hose was single ply, tightly woven and the internal diameter was two and one-half inches. The weight of this linen hose was thirteen and one-fourth ounces per foot length. The hose was woven of twelve lengthwise strands per inch and twelve crosswise or lateral strands per inch. Each strand consisted of fourteen linen threads. The strands were woven so tightly together that the hose was impervious to water. In fact, this type of hose is commonly known as "fire-hose" because it is used as a water hose by municipal fire departments. A ten inch length of this hose was stood on end and the bottom end closed. The hose was then filled with water. A check from day to day for several days showed that no water ran through the walls of the hose which remained dry on the outside and the water level remained approximately the same as the original water level. These tests demonstrated that the hose was waterproof. When a piece of this hose was held before an incandescent electric light no holes or pores in the wall of the hose were visible to the naked eye, showing that the hose was very tightly woven. These two lengths of hose proved entirely ineffective to silence the heater noises. The intensity of the sound when tested by ear demonstrated that this type of hose acted as a stethoscope and was as utterly ineffective to absorb the heater noise as the flexible metal hose and therefore wholly impractical from the standpoint of providing a silent heater.

The linen hose has an additional serious disadvantage which makes it impractical for use with an exhaust type of heater in that it is not fireproof and burns out upon very short usage.

To effectively silence and completely deaden all heater noises regardless of source and whether airborne sounds or otherwise, it is proposed to connect the heater with the hot air registers by an asbestos fabric hose. The applicant has used an asbestos fabric hose, made according to the specifications described in detail below, with his heaters above-mentioned when installed in the exhaust lines of 1934 and 1935 Ford V-8 motors and 1934 and 1935 Packard motors, and has found this type of asbestos hose to be eminently satisfactory and effective to obtain a silently operating exhaust type of heater. There are numerous factors which vary and must be coordinated with the intensity of the sound caused by the heater in the silencing of an exhaust type of heater. Among these variable factors which must be considered and coordinated with the intensity of the sound caused by the heater are the physical characteristics of the hose such as its length, its internal diameter, its wall thickness, its weave and the weight of the hose. One specific example of a practical and silently operating heater is set forth below, but it is specifically understood that the invention is characterized by the coordination of the physical characteristics of the fabric silencing hose with the intensity of the sound to be silenced and these physical characteristics will be different for silencing sounds of different intensity. It has been found that with applicant's type of heater connected in the exhaust line of either a 1935 Ford V-8 or a 1935 Packard that the length of the two and one-fourth inch diameter hose must be at least eight inches in order to sufficiently dampen these heater noises. A preferred form of asbestos hose consists of from ten to twelve lateral strands per inch extending around the circumference of the hose, and twenty strands per inch extending lengthwise of the hose. Each strand is spongy and consists of two threads loosely spun together and can be very easily broken by hand. The tensile strength of each strand ranges between three and ten pounds. This preferred asbestos hose has a wall thickness of one-sixteenth of an inch and each 5.9 feet of the hose weighs one pound where the internal diameter of the hose is two and one-fourth inches. When this type of hose is held against the window in daylight or an incandescent electric light numerous pores are visible which appear to be from about pin hole size to a size barely visible to the naked eye. If a ten inch length of this asbestos hose is stood on end with the bottom end closed and then filled with water, the water will run out completely through the wall of the tube in a very few seconds, that is, approximately three to seven seconds. Since the water comes through the entire wall of the tube and not only through the visible pores, there undoubtedly are legion of small pores invisible to the naked eye which have some sound absorption function or capacity. The existence of these pores is also demonstrated by the fact that the asbestos fabric is spongy. The asbestos fabric can be compressed manually between one's fingers such as by easily forcing one's finger-nail into it thereby leaving a finger-nail imprint. The above-mentioned linen hose is so tightly woven and hard that one cannot manually compress it between his fingers and cannot imprint it with his finger-nail which indicates a substantial difference between the porosity of the asbestos hose and that of the linen hose.

The physical characteristics of the asbestos fabric are such that a pure asbestos fiber thread does not have sufficient tensile strength to permit a tight weave such as the tight weave of the above-mentioned waterproof linen hose. In fact, the asbestos hose which the applicant prefers is made from strands containing about eight percent (8%) cotton fiber which give the strands sufficient tensile strength to permit a weave in which the pores are smaller than obtainable in a pure asbestos hose and range from about pin hole size to a size barely visible to the naked eye and even smaller. This small percentage of cotton may burn out in use of the hose when connected with the heater but this in nowise affects the strength of the hose and its utility. The whole purpose of using this small percentage of cotton is to obtain a weave somewhat tighter than obtainable where pure asbestos is used but still having the porosity desired. However, an asbestos fabric hose containing no cotton can be woven tightly enough to conduct the air, and which is practical for use and plenty porous enough to silence all heater noise.

Another advantage of this asbestos hose is that its sound absorption properties remain excellent even though the hose is wet. A mineral fabric such as asbestos does not absorb water and swell so as to close the pores of the fabric. This is desirable because in use the hose very often becomes wet.

An asbestos hose made according to the above mentioned specifications has proved highly satisfactory in silencing an exhaust type of heater when mounted in the exhaust line of a Ford V-8 engine and a Packard engine. It is, of course, appreciated that the changing of any of the variable factors above-mentioned would necessitate changing one or more of the other factors accordingly, for example, if the intensity of the sound were increased and the diameter of the hose maintained the same, the length of the hose or its porosity would have to be correspondingly increased. On the other hand, if the internal diameter of the hose were increased and the intensity of the noise and porosity of the hose remained the same, it would be necessary to lengthen the hose to obtain the same amount of sound absorption. In other words, these physical characteristics of the sound absorbing of the air conduit must be coordinated with the intensity of the sound caused by the heater.

Since the air conduit 9 must be a non-conductor of sound impulses and must also effectively silence any sound impulses or waves in the heated air which passes through this conduit 9, therefore it is proposed to make this line 9 from a non-metallic fabric 10. The fabric 10 must necessarily be heat resistant and able to withstand the temperature at which the heated air issues from the heater. This temperature ranges as high as 350° F. Preferably the fabric 10 is a loosely woven asbestos fabric. The asbestos fabric is loosely woven so that it looks very similar to woven burlap. The more loosely the fabric is woven the greater the size of the pores and the better it serves its purpose of dampening and eliminating any sound waves set up in the air within the hot air conduit. However the fabric 10 should not be so loosely woven that it will fail to conduct the heated air from the heater to the registers 6. The asbestos fabric hose which is preferred is loosely woven so that very little air will leak through the wall of the tube at operating pressure. (This air leakage is practically nil) but water will pass through the fabric as above described. It must be remembered that the pressure under which the air is forced through the heater and air conduits 9 is relatively small. Furthermore, heat losses by conduction through the wall of the tube are very small.

The fabric from which the hose is made may be any flexible fire-proof non-metallic woven fabric or asbestos fabric woven so that the tube will have high sound absorption characteristics and preferably, though not necessarily, should be limp enough not to be self-supporting in actual usage. If the tube is stiff, it loses much of its sound absorbing properties.

A suitable helical coil spring 11 is inserted in the tube 10 for maintaining the same open and tubular in form. This construction makes the conduit 9 flexible and permits the conduit to be readily curved and bent and thus facilitates getting around any obstructions in the connecting of the registers 6 with the heater 3.

As shown in Fig. 2, the helical coil metal spring 11 is initially the same length as the fabric hose 10. Upon assembling the hot air conduit to the register 6 and the heater 3, the hose 10 is drawn over the heater outlet 12 for about an inch or an inch and a half and clamped in place by the clamp 13. The helical coil spring 11 however abuts against the edge 14 of the hot air outlet 12 and is thus shortened about an inch to an inch and a half, and consequently compressed. The other end of the fabric tube is connected to the mouth 15 of the register 6 in a similar fashion so that the helical coil spring 11 is shortened another inch to an inch and a half and thus further compressed. This shortening of the length of the spring 11 may be varied to suit the conditions which obtain in this heating system. However, owing to the compression of the coil spring 11, the spring yieldably abuts the heater outlet 12 and the register inlet 15 and thus does not rattle. The compression of the spring and shortening of its length causes the spring to expand against the inside wall of the tube 10 and draw the same taut, but at the same time the assembly of the tube 10 and spring 11 remains flexible.

If to any heater causing a noise of a given intensity a conduit is applied having any given set of physical characteristics such as length, diameter and porosity which will effectively silence the heater noises including air-borne sounds, then such a conduit has its physical characteristics coordinated with the intensity of the sound caused by the heater even though the length, for example, of the conduit may be three feet whereas a ten-inch length is all that is necessary. In actual practice for manufacturing economy, as well as to prevent rattles which would otherwise be set up if a portion of the conduit were a metal tube, the entire conduit between the heater and the rear register is composed of woven asbestos fabric whereas for sound absorbing purposes only approximately ten inches of this length is necessary. In other words, coordination as herein used includes a conduit which has greater sound absorbing capacity than is necessary whereas it does not include a conduit which has less sound absorbing capacity than is necessary for effectively silencing the air-borne and other heater noises.

The same exhaust type of heater when placed upon one type, design or make of motor will cause noise of a different intensity than when placed upon a motor of a different make, type and design and different heaters will, of course, cause noises of different intensity. However, from the above description it is evident that the invention is essentially characterized by the fact that the physical characteristics of the conduit which control its sound absorption or silencing capacity are coordinated with the intensity of the sound caused by the heater so that for all practical purposes the heater noises are silenced and not passed into the body either by direct conduction of the conduit, that is, in the form of vibrations communicated directly to the conduit, or as air-borne sounds.

I claim:

1. In an automotive vehicle having a heater for heating air preparatory to being conducted into the vehicle body and constituting a source of noise, a conduit for conducting said heated air into the vehicle body comprising a heat-resistant, flexible fabric which is a non-conductor of sound in the form of vibration directly communicated to the fabric and which is an absorber of sound borne by the air passing through the conduit, the said conduit having its physical characteristics which control its air-borne sound absorption capacity coordinated with the intensity of the sound caused by the heater whereby the heater noises are practically silenced and thereby prevented from passing into the vehicle body.

2. In an automotive vehicle having a heater for heating air preparatory to being conducted into the vehicle body and constituting a source of noise, a conduit for conducting said heated air into the vehicle body comprising a heat-resistant, flexible non-metallic woven fabric which is a non-conductor of sound in the form of vibration directly communicated to the fabric and which is an absorber of sound borne by the air passing through the conduit, the said conduit having its internal diameter and length and the porosity of its fabric wall coordinated with the intensity of the sound caused by the heater whereby the heater noises are practically silenced and thereby prevented from passing into the vehicle body.

3. In an automotive vehicle having a heater for heating air preparatory to being conducted into the vehicle body and constituting a source of noise, a conduit for conducting said heated air into the vehicle body comprising a heat-resistant, flexible loosely woven asbestos fabric which is a non-conductor of sound in the form of vibration directly communicated to the fabric and which is an absorber of sound borne by the air passing through the conduit, the said conduit having its physical characteristics which control its air-borne sound absorption capacity coordinated with the intensity of the sound caused by the heater whereby the heater noises are practically silenced and thereby prevented from passing into the vehicle body.

4. In an automotive vehicle having a heater for heating air preparatory to being conducted into the vehicle body and constituting a source of noise, a conduit for conducting said heated air into the vehicle body comprising a heat-resistant, flexible loosely woven asbestos fabric which is a non-conductor of sound in the form of vibration directly communicated to the fabric and which is an absorber of sound borne by the air passing through the conduit, the said fabric having a porosity ranging from pores approximately of pin hole size downwardly to pores invisible to the naked eye, the said conduit having a length of at least ten inches and an internal diameter of approximately two and one fourth inches for such length whereby the heater noises are practically silenced and thereby prevented from passing into the vehicle body.

5. In an automotive vehicle having a heater for heating air preparatory to being conducted into the vehicle body and constituting a source of noise, a conduit for conducting said heated air into the vehicle body comprising a heat-resistant, flexible loosely woven asbestos fabric which is a non-conductor of sound in the form of vibration directly communicated to the fabric and which is an absorber of sound borne by the air passing through the conduit, the said fabric comprising from ten to twelve lateral strands per inch extending around the circumference of the hose and twenty strands per inch extending lengthwise of the hose and a wall thickness of approximately one-sixteenth of an inch, the said conduit having a length of at least ten inches, an internal diameter of approximately two and one fourth inches for such length, and such ten inch length of conduit weighing approximately .14 pound whereby the heater noises are practically silenced and thereby prevented from passing into the vehicle body.

JAMES J. SUNDAY.